United States Patent
Gardaz (10) Patent No.: US 9,223,149 B2
(45) Date of Patent: Dec. 29, 2015

(54) SIDEPIECE FOR EYEGLASSES, EYEGLASSES INCLUDING AT LEAST ONE SUCH SIDEPIECE, AND METHOD FOR ASSEMBLING SUCH A SIDEPIECE

(75) Inventor: Francois Gardaz, Macao (MO)

(73) Assignee: KILLINE OPTICAL LTD, Macau ( * ) Notice: Subject to any disclaimer, the term of this patent is extended or adjusted under 35 U.S.C. 154(b) by 0 days.

(21) Appl. No.: 14/001,613

(22) PCT Filed: Feb. 17, 2012

(86) PCT No.: PCT/FR2012/050346
§ 371 (c)(1),
(2), (4) Date: Aug. 26, 2013

(87) PCT Pub. No.: WO2012/114026
PCT Pub. Date: Aug. 30, 2012

(65) Prior Publication Data
US 2013/0329181 A1 Dec. 12, 2013

(30) Foreign Application Priority Data
Feb. 24, 2011 (FR) ...................... 11 51495

(51) Int. Cl.
*G02C 11/02* (2006.01)
*G02C 5/18* (2006.01)
*G02C 5/14* (2006.01)
*G02C 13/00* (2006.01)
*B29D 12/02* (2006.01)

(52) U.S. Cl.
CPC ............... *G02C 11/02* (2013.01); *B29D 12/02* (2013.01); *G02C 5/146* (2013.01); *G02C 5/18* (2013.01); *G02C 13/001* (2013.01); *Y10T 29/49826* (2015.01)

(58) Field of Classification Search
CPC ............ G02C 11/02; G02C 1/04; G02C 5/00; G02C 3/003; G02C 1/06
USPC ............ 351/51–52, 66, 83, 85, 111–123, 178
See application file for complete search history.

(56) References Cited

U.S. PATENT DOCUMENTS

| | | | |
|---|---|---|---|
| 2,797,617 A * | 7/1957 | Ring | ............................ 351/118 |
| 3,582,192 A | 6/1971 | Gitlin | |
| 4,958,923 A | 9/1990 | Rosenson | |
| 2007/0242211 A1 | 10/2007 | Chao | |
| 2012/0075571 A1* | 3/2012 | Silver | ............................ 351/52 |

FOREIGN PATENT DOCUMENTS

| | | |
|---|---|---|
| DE | 29803017 U1 | 10/1998 |
| FR | 2605422 A3 | 4/1988 |
| GB | 733818 A | 7/1955 |

OTHER PUBLICATIONS

International Search Report issued Jun. 5, 2012—re: PCT/FR2012/050346; US 2007/242211 A1, FR 2 605 422 A3, U.S. Pat. No. 3,582,192 A, GB 733 818 A, U.S. Pat. No. 4,958,923 A, DE 298 03 017 U1.

* cited by examiner

*Primary Examiner* — Hoa C Nguyen
*Assistant Examiner* — Roseline Alicea Rivera
(74) *Attorney, Agent, or Firm* — Cantor Colburn LLP (57) ABSTRACT

The invention relates to a sidepiece (3) comprising a reinforcement (5) that is to be hinged onto a frame (2). The sidepiece (3) includes: a first strip (11) for covering a first portion of the reinforcement (5); a second strip (12) for covering a second portion of the reinforcement (5); a first connection means (21) for guiding the first strip (11) in translation and holding same on the reinforcement (5); and a second connection means (22) for guiding at least the second strip (12) in translation and holding same on the reinforcement (5).

15 Claims, 5 Drawing Sheets

SIDEPIECE FOR EYEGLASSES, EYEGLASSES INCLUDING AT LEAST ONE SUCH SIDEPIECE, AND METHOD FOR ASSEMBLING SUCH A SIDEPIECE

FIELD

The present invention relates to a sidepiece for eyeglasses and to eyeglasses comprising at least one such sidepiece. Moreover, the present invention relates to a method for assembling such a sidepiece.

The field of application of the present invention is in particular that of prescription eyeglasses, sunglasses, protective and/or safety glasses.

BACKGROUND

It is known for eyeglasses to comprise an optical façade provided with optical lenses and/or sunglass lenses and/or protective lenses and/or safety lenses. Eyeglasses generally comprise a frame, intended to support the optical façade, and two sidepieces for eyeglasses, sometimes called temple arms, which are connected to the frame by an articulation.

A sidepiece comprises a core which is generally rigid and which extends between a front end and a rear end. The front end is intended to be articulated onto a frame. The rear end is intended to receive a tip cover, the purpose of which is to wrap around, and possibly to rest on, a user's ear.

In order to modify the appearance of the eyeglasses and in particular in order to decorate the sidepieces, US2009096982A1 describes sidepieces for eyeglasses on which are arranged removable decorative elements.

However, such decorative elements may come loose from the sidepieces. Moreover, they are relatively difficult to attach to the sidepieces.

The present invention aims to provide a solution to all or some of the abovementioned problems.

SUMMARY

To that end, the invention relates to a sidepiece for eyeglasses, comprising a core extending between a front end, intended to be articulated onto a frame, and a rear end facing away therefrom, the sidepiece being characterized in that it comprises at least:
  one first strip suitable to cover a first part of the core, the first strip preferably having a decorative external surface;
  one second strip suitable to cover a second part of the core, the second strip preferably having a decorative external surface;
  first connection means fashioned on said first part of the core, the first connection means being designed to guide the first strip in translation and to hold the first strip on the core; and
  second connection means fashioned on said second part of the core, the second connection means being designed to guide at least the second strip in translation and to hold the second strip on the core.

In other words, the sidepiece comprises at least two strips and two rails or slideways, onto which are fitted the strips, which can be decorative.

Such a sidepiece for eyeglasses thus permits simple and rapid assembly and disassembly of the strips on the core. Moreover, in the assembled state, the strips are held on the core with no risk of coming loose.

In the present application, the expression "front" designates an element intended to be located close to the frame, i.e. close to the user's face. In the present application, the expression "rear" designates an element intended to be located close to one tip cover of the eyeglasses, i.e. close to the user's ear.

According to one embodiment, the core has an upper edge and a lower edge, the first connection means being arranged on all or part of the upper edge, the second connection means being arranged on all or part of the lower edge.

In other words, the first connection means are arranged on the top portion of the core and the second connection means are arranged on the bottom portion of the core.

The first strip can thus cover and decorate the top portion of the core and the second strip can cover and decorate the bottom portion of the core.

In the present application, an "upper" or "top" element is located relatively close to the crown of the head of a user who is standing up and whose head is level, whereas a "lower" or "bottom" element is more distant therefrom.

According to one embodiment, the first connection means and/or the second connection means extend substantially as far as the front end so as to allow, respectively, the first strip or the second strip to be introduced via the front end.

A user can thus introduce and remove the strip or strips via the front side of the eyeglasses as often as desired in order to modify the appearance of the eyeglasses and without having to dismantle other components of the sidepiece.

According to one embodiment, the first connection means and/or the second connection means have, respectively, at least one male element projecting from an internal face of the core and/or from an external face of the core, the male element extending at least along a segment of the core, and in which at least one of the first strip and the second strip has a groove the shape of which is matched to that of the male element.

A male element of this type and a groove of this type can thus engage in order to guide a strip in translation and hold it on the core.

In the present application, the expression "internal" denotes an element which is turned toward the head of a user wearing the eyeglasses. In the present application, the expression "external" denotes an element which is turned away from the head of a user wearing the eyeglasses.

According to one embodiment, the core has a cross section comprising:
  a substantially flat web and
  two substantially flat flanges arranged perpendicular to the web and symmetrically with respect to the web, each flange defining a male element.

In other words, the core has a substantially H-shaped cross section.

Such a core is thus relatively simple to manufacture.

According to another embodiment, the first connection means and/or the second connection means extend in a discontinuous or intermittent manner substantially between the front end and an intermediate point located between the front end and the rear end.

In other words, the rails form separate segments. According to one embodiment, the first connection means and/or the second connection means extend in a continuous manner substantially between the front end and an intermediate point located between the front end and the rear end.

The or each strip is thus guided and held on an entire portion of the core between the front end and the intermediate point.

According to one embodiment, the first connection means and/or the second connection means are similar.

In particular, the first connection means and/or the second connection means are symmetric at least with respect to a median line of the core.

The first strip and the second strip, or the first and second strips of the two sidepieces, are thus interchangeable and the user can fasten them to the core without having to tell one from the other.

According to one embodiment, at least one of the first strip and the second strip is at least partially formed from an elastically deformable material, at least one of the first strip and the second strip preferably being molded.

According to one embodiment, at least one of the first strip and the second strip is entirely formed from an elastically deformable material.

Such strips can thus be matched to a sidepiece, whatever its shape, straight or curved, or its radius of curvature.

According to one embodiment, at least two of said strips are formed so as to fit together in order to hide the core either entirely or partially.

The or each strip thus clads or decorates several faces of the core, which gives the sidepiece a high-quality appearance. The strips can fit together on one or more surfaces.

According to one embodiment, at least one of the first strip and the second strip has a plugged end arranged so as to cover the front end of the core.

The or each strip thus clads or decorates the front end of the core, which front end is partially visible to an observer face to face with the user of the eyeglasses.

According to one embodiment, the shape of the plugged end is matched to the front end of the first connection means or the front end of the second connection means.

A matched or complementary shape of this type thus allows a strip to engage with the front end of the core. This shape matching plays the role of a positioning stop, preventing the rear end of a strip from coming into contact with the tip cover and thus avoids this rear end suffering deformation and unsightly upsetting.

According to one alternative embodiment, the shape of the plugged end is matched to the rear end of the first connection means or the rear end of the second connection means.

According to one embodiment, the core comprises at least one holding member designed to immobilize the first strip or the second strip in translation with respect to the core, at least one holding member preferably being arranged so as to engage with a rear termination of the first strip or with a rear termination of the second strip.

Such a holding member thus makes it possible for a strip to be held in place on the core when the strip is in the assembled position.

According to another embodiment, the core comprises two holding members designed to immobilize, respectively, the first strip and the second strip in translation with respect to the core.

According to one embodiment, at least one holding member is formed by a boss arranged so as to engage with a hole fashioned in the first strip or in the second strip.

Such a boss thus makes it possible to produce a reliable holding member having a simple structure.

According to one embodiment, at least one holding member is formed by a hole arranged so as to engage with a boss produced on the first strip or on the second strip.

Such a hole thus makes it possible to produce a reliable holding member having a simple structure. The boss is therefore arranged on the first strip or on the second strip.

According to one embodiment, one holding member is arranged so as to engage with a rear termination of the first strip or of the second strip.

In other words, this holding member is arranged on the side of the tip cover of the eyeglasses rather than toward the frame.

A holding member of this type thus makes it possible to immobilize in translation a strip introduced via the front end.

In one alternative embodiment, a holding member is arranged so as to engage with a front termination of the first strip or of the second strip which is in this case introduced via the rear of the core.

A holding member of this type thus makes it possible to immobilize in translation a strip introduced via the rear end.

According to one embodiment, the sidepiece further comprises:
- at least one third strip suitable to cover at least one third part of the core; and
- at least third connection means fashioned on said third part of the core, the third connection means being designed to guide at least the third strip in translation and to hold the third strip on the core.

A third strip of this type thus makes it possible to further modify the appearance of the sidepiece and therefore of the eyeglasses.

Moreover, the present invention relates to eyeglasses comprising a frame and characterized in that they further comprise at least one sidepiece, preferably two sidepieces, as disclosed above.

A user of such eyeglasses can thus modify the appearance of one or both sidepieces simply and quickly.

Moreover, the present invention relates to a method for assembling a sidepiece as disclosed above which is articulated onto a frame for eyeglasses as disclosed above, the method comprising the steps of:
- folding the sidepiece so as to place it close to the frame;
- engaging via the front end the first strip and/or the second strip respectively on the first connection means and on the second connection means;
- guiding in translation the first strip and the second strip respectively on the first connection means and on the second connection means such that the first strip and the second strip cover, respectively, the first part of the core and the second part of the core; and
- opening the sidepiece in order to place it in the position of use.

A user can thus assemble a sidepiece quickly and simply in order to modify the appearance thereof.

BRIEF DESCRIPTION OF THE DRAWINGS

The present invention will be well understood and the advantages thereof will also be apparent in light of the following exemplary and non-limiting description given with reference to the appended drawings, in which.

DETAILED DESCRIPTION OF THE DRAWINGS

Figure 1:
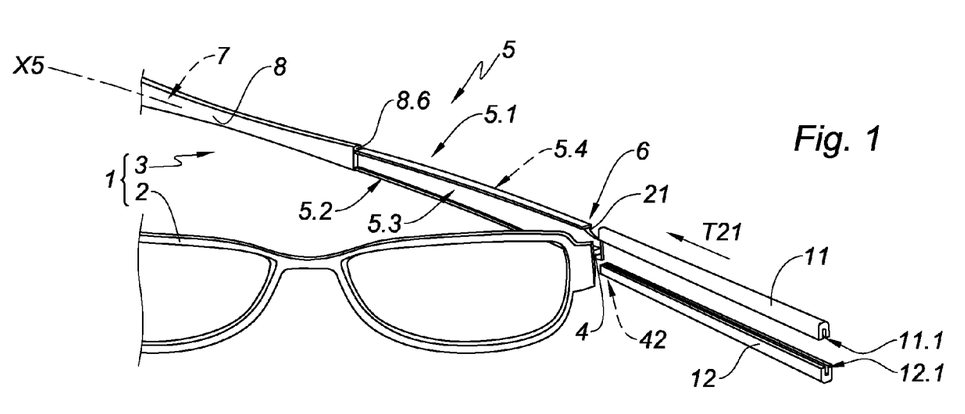
FIG. 1 is a perspective view of part of a pair of eyeglasses according to the invention, comprising a sidepiece according to a first embodiment of the invention, in an initial step of an assembly method according to the invention.

FIG. 1 shows eyeglasses 1 comprising a frame 2 and a sidepiece 3. The sidepiece 3 is articulated onto the frame 2 by means of an articulation 4.

The sidepiece 3 comprises a core 5 extending between a front end 6 and a rear end 7, parallel to a longitudinal line X5. Here, the longitudinal line X5 is slightly curved. The rear end 7 faces away from the front end 6 and receives a tip cover 8 which surrounds a rear portion of the core 5.

The core 5 has an upper edge 5.1 and a lower edge 5.2. The core 5 may have a rigid structure, which may be produced, i.e. formed, in particular from steel, composite material or synthetic plastic. In the example of the figures, the core 5 is produced, i.e. formed, from a nickel-copper-iron alloy known as Monel.

The sidepiece 3 comprises a first strip 11 and a second strip 12. The first strip 11 and the second strip 12 may be produced, i.e. formed, at least in part from an elastically deformable material, for example rubber. In the example of the figures, the first strip 11 and the second strip 12 are entirely produced, i.e. formed, from an elastically deformable material and are molded.

Figure 2:
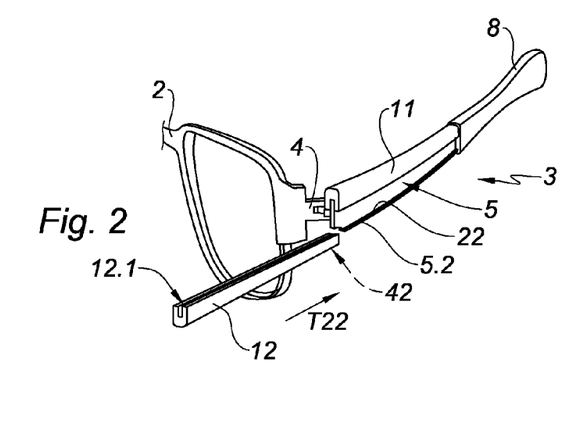
FIG. 2 is a perspective view, from a different angle from FIG. 1, of the sidepiece of FIG. 1, in a subsequent step of the assembly method according to the invention.
Figure 3:
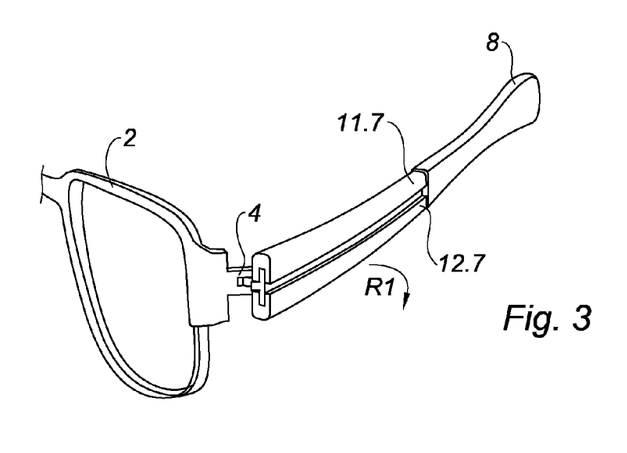
FIG. 3 is a view, similar to FIG. 2, of the sidepiece of FIG. 2, in a subsequent step of the assembly method according to the invention.

As shown in FIG. 2, the first strip 11 is suitable to cover a first portion of the core 5, in this case the top portion, of which the upper edge 5.1 is a part. As shown in FIG. 3, the second strip 12 is suitable to cover a second portion of the core 5, in this case the bottom portion, of which the lower edge 5.2 is a part.

The first strip 11 and the second strip 12 can have a decorative external surface. In the present application, the expression "decorative external surface" designates an external surface having decoration. Such decoration can take the form of a chosen color and/or chosen designs, for example raised designs and/or recessed designs and/or colored designs and/or textured designs and/or different materials.

The sidepiece 3 moreover comprises a top rail 21, which can be seen in FIGS. 1, 5, 6, 7, 9 and 11, and a bottom rail 22, which can be seen in FIGS. 2, 5, 7 and 9. In the example of the figures, the top rail 21 and the bottom rail 22 are similar and extend substantially along the longitudinal line X5.

The top rail 21 forms first connection means fashioned on the first portion of the core 5. In the example of the figures, these first connection means are fashioned or arranged on the greater part of the upper edge 5.1. The top rail 21 is welded onto the core 5.

The top rail 21 is designed to guide the first strip 11 in translation, substantially in the direction of the longitudinal line X5. This translation is indicated in FIG. 2 by an arrow T21. Furthermore, the top rail 21 is designed to hold the first strip 11 on the core 5.

The bottom rail 22 forms second connection means fashioned on the second portion of the core 5. In the example of the figures, these second connection means are fashioned or arranged on the greater part of the lower edge 5.2. The bottom rail 22 is welded onto the core 5.

The bottom rail 22 is designed to guide the second strip 12 in translation, substantially in the direction of the longitudinal line X5. This translation is indicated in FIG. 2 by an arrow T22. Furthermore, the bottom rail 22 is designed to hold the second strip 12 on the core 5.

As shown in FIG. 1, the top rail 21 and the bottom rail 22 extend substantially as far as the front end 6 so as to permit, respectively, the first strip 11 and the second strip 12 to be introduced via the front end 6.

When the sidepiece 3 is folded and placed close to the frame 2, a user can engage the first strip 11 on the top rail 21 via the front end 6. The user can then guide the first strip 11 in translation on the top rail 21 in the direction of the arrow T21, such that the first strip 11 covers the top part of the core 5, as shown in FIG. 2.

As shown in FIG. 2, after being guided in translation, the first strip 11 is held in place on the core 5 by the top rail 21. The user can then engage the second strip 12 on the bottom rail 22 via the front end 6. The user can then guide the second strip 12 in translation on the top rail 22 in the direction of the arrow T22, such that the second strip 12 covers the bottom part of the core 5, as shown in FIG. 3.

As shown in FIG. 3, after an assembly method according to the invention has been carried out, the sidepiece 3 is unfolded, in the direction of an arrow R1, in order to be placed in a position for the eyeglasses to be worn by the user.

Figure 4:
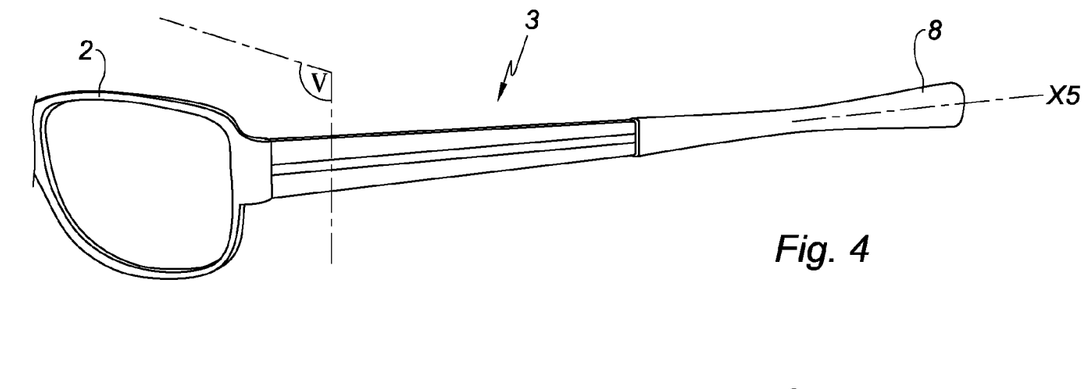
FIG. 4 is a view, similar to FIG. 3, of the sidepiece of FIG. 3, in a subsequent step of the assembly method according to the invention.

As shown in FIG. 4, after an assembly method according to the invention has been carried out, the sidepiece 3 is in its assembled state in which the first strip 11 covers the top part of the core 5 and the second strip 12 covers the bottom part of the core 5. In other words, the sidepiece 3 is clad and decorated with the first strip 11 and the second strip 12.

Figure 5:
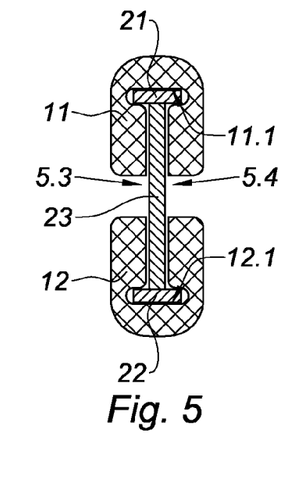
FIG. 5 is a view in section on plane V in FIG. 4.
Figures 9, 10, 12, 13, 14:
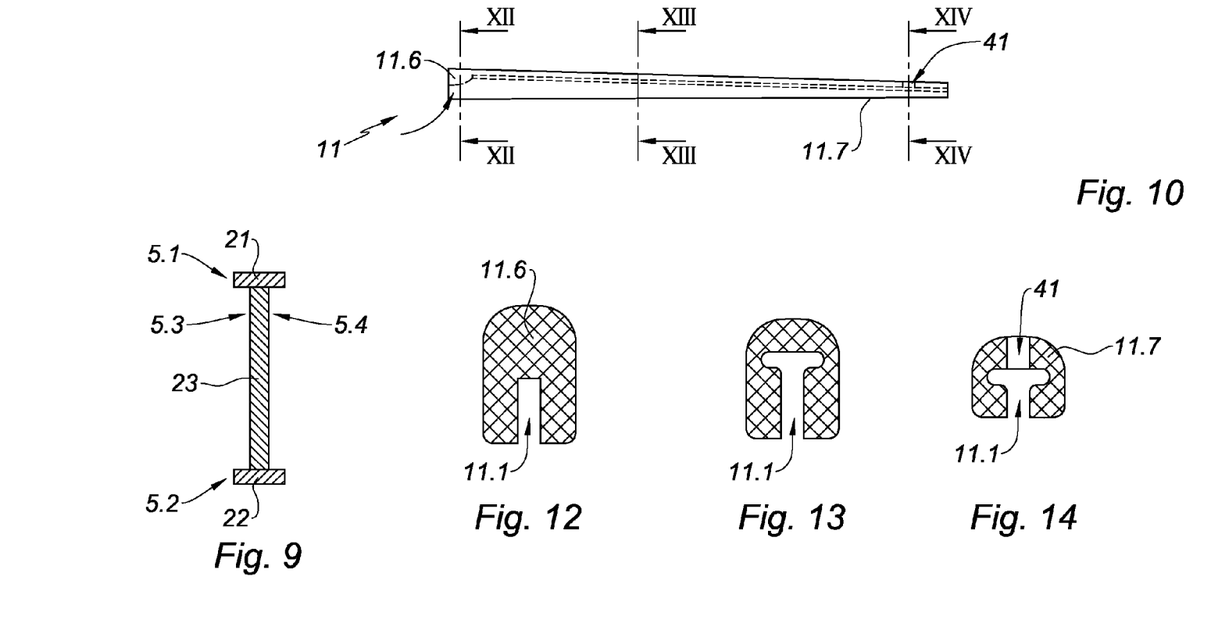
FIG. 9 is a view in section along the line IX-IX in FIG. 8.
FIG. 10 is a side view of a strip belonging to the sidepiece of FIG. 1.
FIG. 12 is a view in section along the line XII-XII in FIG. 10.
FIG. 13 is a view in section along the line XIII-XIII in FIG. 10.
FIG. 14 is a view in section along the line XIV-XIV in FIG. 10.

As shown in FIGS. 5 and 9, in order to guide and hold the first strip 11 and the second strip 12, respectively, the top rail 21 and the bottom rail 22 each have one male element which projects from an internal face 5.3 of the core 5 and from an external face 5.4 of the core 5.

Figure 6:
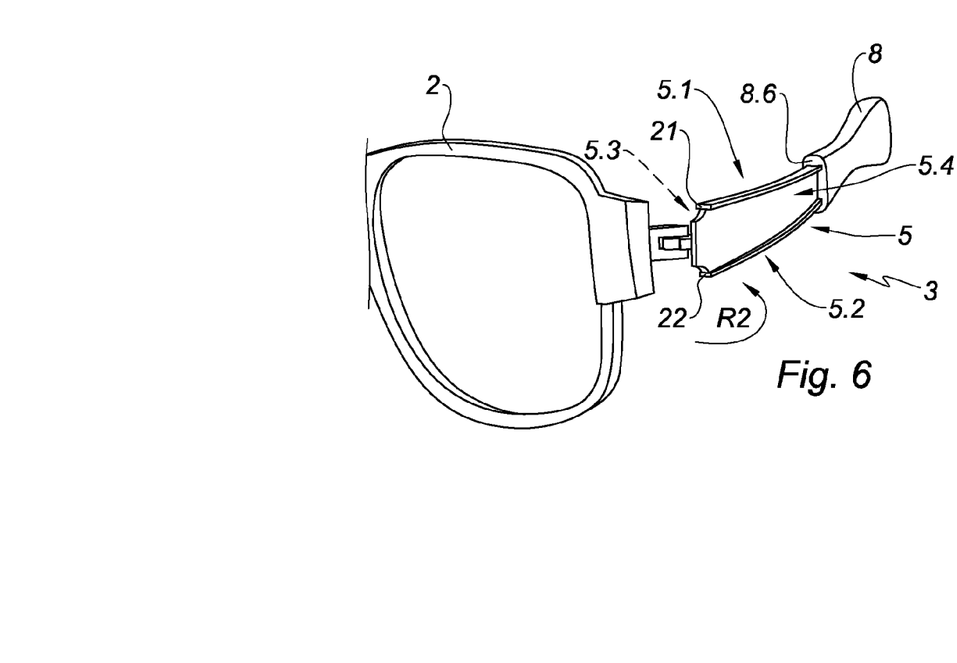
FIG. 6 is a view, similar to FIG. 2, showing a core belonging to the sidepiece of FIG. 1.

In FIG. 6, the sidepiece 3 is closed or folded in the direction of an arrow R2 so as to place it in a preliminary position for carrying out an assembly method according to the invention.

As shown in FIGS. 6, 7, 8 and 9, the core 5 is formed by a profile section, a cross section of which comprises a substantially flat web 23 and two flanges which form the top rail 21 and the bottom rail 22. The top rail 21 and the bottom rail 22 are substantially flat and arranged perpendicular to the web 23 and symmetrically with respect to the web 23. Each flange, specifically the top rail 21 or the bottom rail 22, defines a T-shaped male element.

The T-shaped male element extends along a segment of the core 5 between the front end 6 and a front termination 8.6 of the tip cover 8. The front termination 8.6 defines an intermediate point located between the front end 6 and the rear end 7. The top rail 21 and the bottom rail 22 extend in a continuous manner substantially between the front end 6 and the front termination 8.6.

Insofar as the first strip 11 is similar to the second strip 12, the following description of the first strip 11—with reference to FIGS. 10, 11, 12, 13 and 14—can be transposed for the description of the second strip 12.

As shown in FIGS. 5, 13 and 14, the first strip 11 has a first groove 11.1 the shape of which is matched to the top rail 21, i.e. is matched to a T-shaped male element. Likewise, the second strip 12 has a second groove 12.1 the shape of which is matched to the bottom rail, i.e. is matched to a T-shaped male element. These matched shapes make it possible both to guide and to hold the first strip 11 and the second strip 12, respectively, on the core 5.

As shown in FIG. 5, the first strip 11 is formed so as to cover an internal surface and an external surface of the top part of the core 5. Likewise, the second strip 12 is formed so as to cover an internal surface and an external surface of the bottom part of the core 5. In other words, the first strip 11 and the second strip 12 each partially clad the upper edge 5.1 and the internal and external faces (5.3 and 5.4 respectively) of the core 5.

Figures 8, 11, 15, 16, 17:
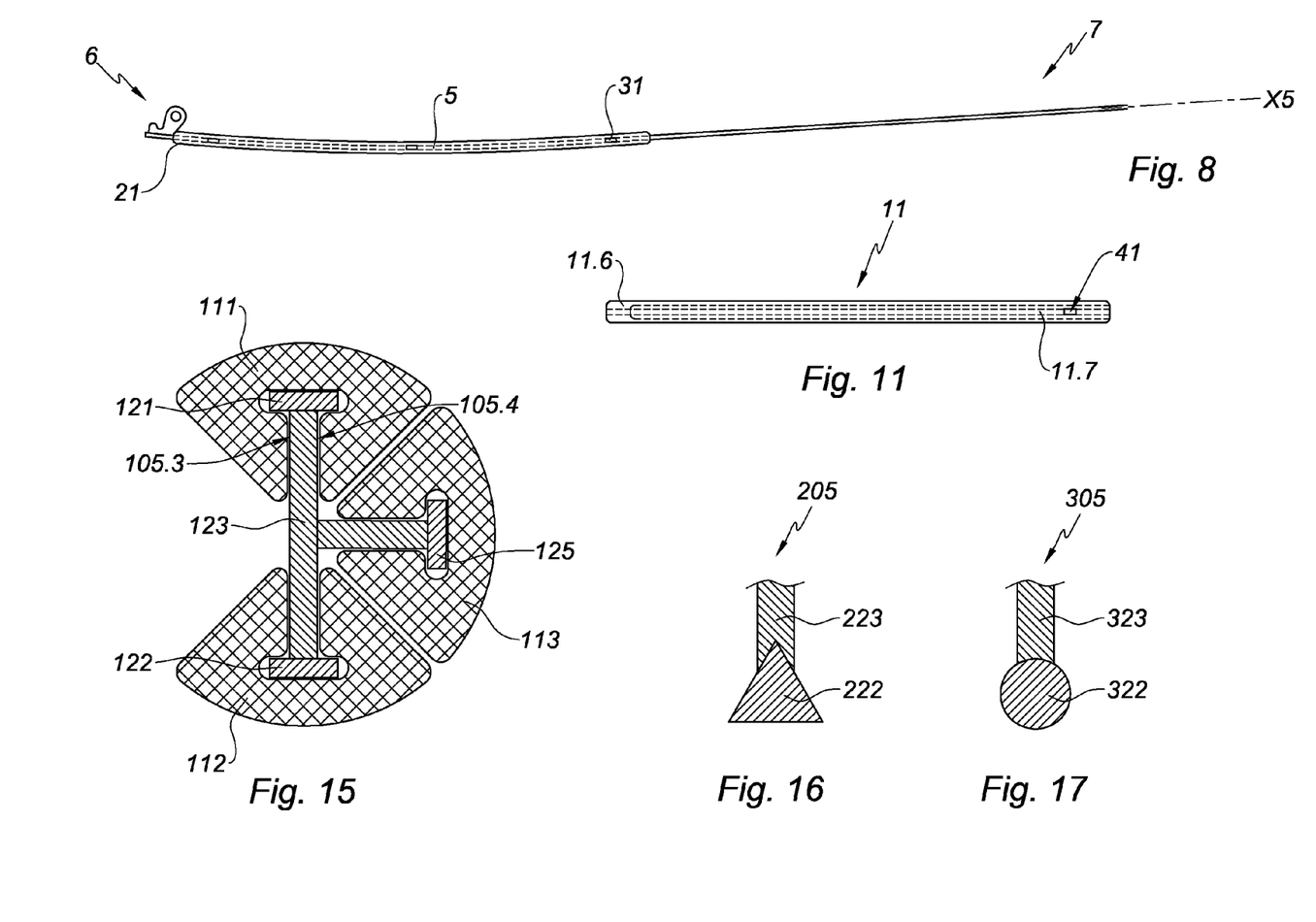
FIG. 8 is a view from above of the core of FIG. 6.
FIG. 11 is a view from above of the strip of FIG. 10.
FIG. 15 is a view, similar to FIG. 9, of part of a sidepiece according to a second embodiment of the invention.
FIG. 16 is a view, partially similar to FIG. 15, of part of a sidepiece according to a third embodiment of the invention.
FIG. 17 is a view, similar to FIG. 16, of part of a sidepiece according to a fourth embodiment of the invention.

As shown in FIGS. 10, 11 and 12, the first strip 11 has one plugged end 11.6 which is arranged so as to cover the front end 6 of the core 5. The shape of the plugged end 11.6 is matched to the front end 6 of the top rail 21. The plugged end 11.6 is formed by an extra thickness of material which blocks off part of the groove 11.1.

Figure 7:
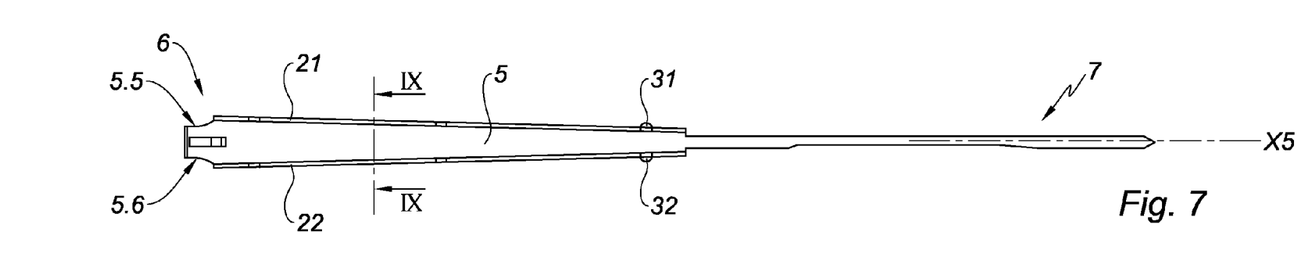
FIG. 7 is a side view of the core of FIG. 6.

Furthermore, the core 5 comprises a top boss 31 and a bottom boss 32 which are shown in FIG. 7 and which each act as a holding member designed to immobilize the first strip 11 and the second strip 12, respectively, in translation with respect to the core 5.

To that end, the top boss 31 is arranged so as to engage with a first hole 41, shown in FIGS. 10, 11 and 41, which is fashioned in the first strip 11. Likewise, the bottom boss 32 is arranged so as to engage with a second hole 42, indicated in FIGS. 1 and 2, which is fashioned in the second strip 12.

The top boss 31 is located close toward the rear of the first strip 11 and the bottom boss 32 is located toward the rear of the second strip 12. Thus, the top boss 31 and the bottom boss 32 are arranged so as to engage, respectively, with a rear termination 11.7 of the first strip 11 and with a rear termination 12.7 of the second strip 12.

Furthermore, the front end 6 has a top cut-out or curved fillet 5.5 and a bottom curved fillet 5.6. On the first strip 11 and the second strip 12, the plugged ends 11.6 and equivalent are formed so as to engage by virtue of matched or complementary shapes respectively with the top curved fillet 5.5 and the bottom curved fillet 5.6. This engagement acts as a stop in order to prevent deformation as a result of the rear terminations 11.7 and 12.7, respectively, being crushed against the tip cover 8.

One method, according to the invention, for assembling the sidepiece 3 comprises the steps of:
- folding or closing the sidepiece 3 so as to place it close to the frame 2;
- engaging via the front end 6 the first strip 11 and/or the second strip 12 respectively on the top rail 21 and the bottom rail 22;
- guiding in translation the first strip 11 and the second strip 12 respectively on the top rail 21 and the bottom rail 22 such that the first strip 11 and the second strip 12 cover, respectively, the first part of the core 5 and the second part of the core 5; and
- opening or unfolding the sidepiece 3 in order to place it in a position for the eyeglasses to be worn by a user.

FIG. 15 shows in part a sidepiece 103 according to a second embodiment of the invention. The above description of the sidepiece 3 can be transposed for the sidepiece 103, except for the differences mentioned below. An element of the sidepiece 103 which is similar to or which corresponds to an element of the sidepiece 3, whether by its structure or its function, bears in the following the same reference numeral, augmented by 100.

The following are therefore defined: a core 105, a first strip 111, a second strip 112, a top rail 121, a bottom rail 122, a web 123, an internal face 105.3 and an external face 105.4.

The sidepiece 103 differs from the sidepiece 3 in that the sidepiece 103 moreover comprises a third strip 113 and a third rail 125. The third strip 113 is suitable to cover a third part of the core 105, in this case the external face 105.4. The third rail 125 forms third connection means fashioned on the external face 105.4 and designed to guide the third strip 113 in translation and to hold the third strip 113 on the core 105.

The sidepiece 103 differs from the sidepiece 3 in that at least two of its strips fit together so as to mask the upper edge, or the lower edge, and the external face 105.4 of the core 105. As shown in FIG. 15, the first strip 111, the second strip 112 and the third strip 113 have corresponding oblique surfaces which fit together two by two.

FIG. 16 shows a core 205 according to a third embodiment of the invention. The core 205 differs from the core 5 in that a bottom rail 222 has a triangular cross section, which makes it possible to clad the sidepiece with a strip having a particular shape and appearance.

FIG. 17 shows a core 305 according to a fourth embodiment of the invention. The core 305 differs from the core 5 in that a bottom rail 322 has a circular cross section, which makes it possible to clad the sidepiece with a strip having a particular shape and appearance.

Figures 18, 19, 20, 21:
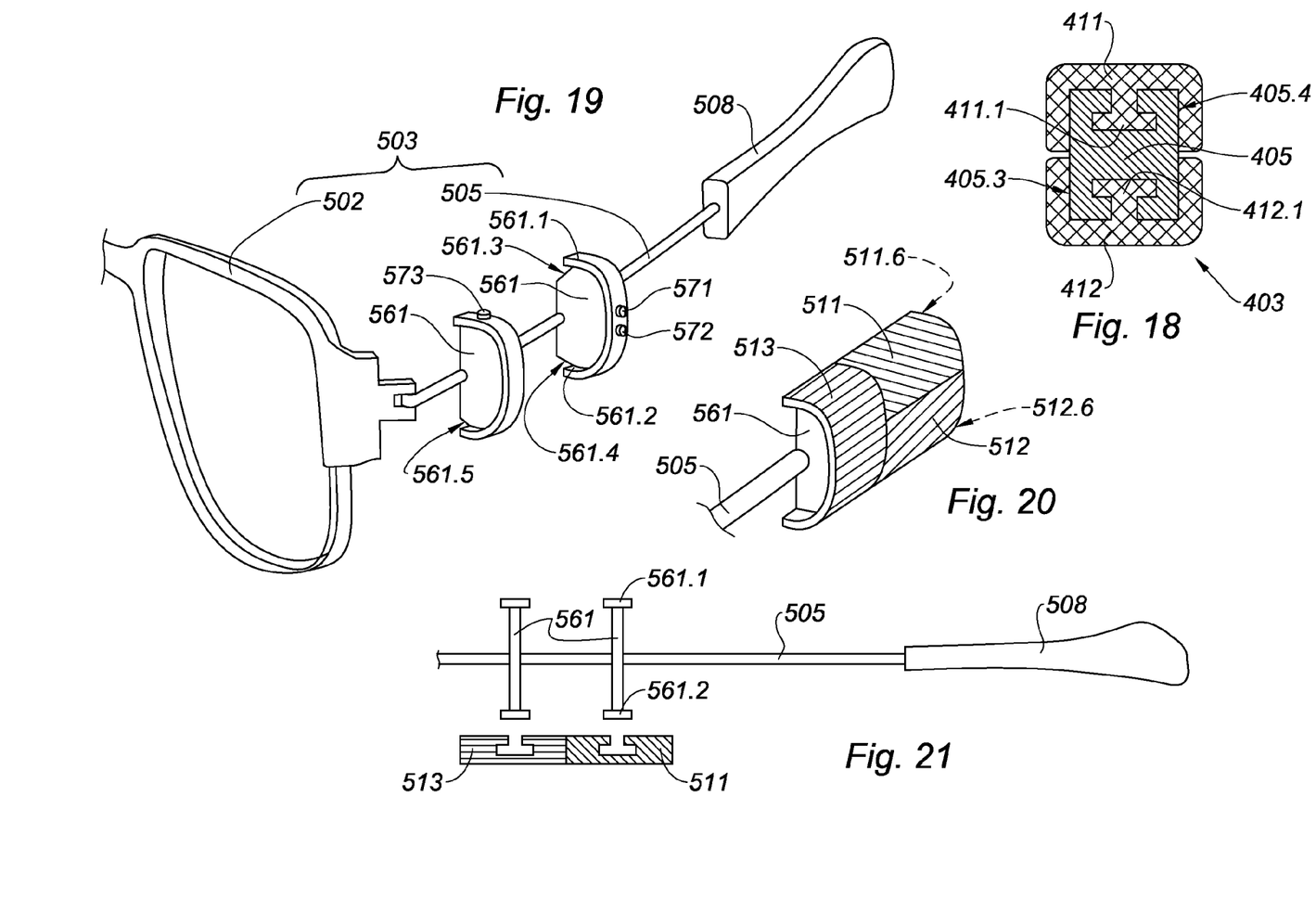
FIG. 18 is a view in section, similar to FIG. 5, showing a sidepiece according to a fifth embodiment of the invention.
FIG. 19 is a view, similar to FIG. 6, showing part of a sidepiece according to a sixth embodiment of the invention.
FIG. 20 is a view, similar to FIG. 3, of part of the sidepiece of FIG. 19, in the assembled state following a method according to the invention.
FIG. 21 is a view, similar to FIG. 7, of part of the sidepiece of FIG. 19.

FIG. 18 is a view in section of a sidepiece 403 according to a fifth embodiment of the invention. The above description of the sidepiece 3 can be transposed for the sidepiece 403, except for the differences mentioned below. An element of the sidepiece 403 which is similar to or which corresponds to an element of the sidepiece 3, whether by its structure or its function, bears in the following the same reference numeral, augmented by 400.

The following are therefore defined: a core 405, a first strip 411, a second strip 412, an internal face 405.3 and an external face 405.4.

The sidepiece 403 differs from the sidepiece 3 in that it comprises a top rail 411.1 and a bottom rail 412.1 which are male in shape and are fashioned, respectively, on the first strip 411 and on the second strip 412. The top rail 411.1 and the bottom rail 412.1 engage in translation with T-shaped female slideways which are fashioned respectively on the middle of the upper edge and on the middle of the lower edge of the core 405. In other words, the core 403 have a significant thickness and the connection means are fashioned in the thickness of the core 405. Thus, the male and female components are "inverted" with respect to the first embodiment described above.

FIGS. 19, 20 and 21 show, in section, a sidepiece 503 according to a sixth embodiment of the invention. The above description of the sidepiece 3 can be transposed for the sidepiece 503, except for the differences mentioned below. An element of the sidepiece 503 which is similar to or which corresponds to an element of the sidepiece 3, whether by its structure or its function, bears in the following the same reference numeral, augmented by 500.

The following are therefore defined: a frame 502, a core 505, a tip cover 508, a first strip 511 and a second strip 512.

The sidepiece 503 differs from the sidepiece 3 in that the core 505 features several supports, two of which are shown with the reference 561 in FIGS. 19 to 21. The supports 561 and equivalents are substantially in the shape of half-disks centered on and perpendicular to the core 505. The supports 561 are approximately 20 mm high.

The supports 561 each comprise rails 561.1 and 561.2 which form first connection means and second connection means, which extend over the circumference of the supports 561 and which are joined to each other.

As shown in FIG. 21, a user can introduce the first strip 511 and the second strip 512 onto the rails 561.1 and 561.2 in translation along a curve. Alternatively, one single strip 513 is introduced onto a support 561.

Studs 571, 572 and 573 form members for holding the first strip 511, the second strip 512 and the single strip 513, respectively. The studs 571, 572 and 573 are similar, in form and in function, to the stud 31 of the sidepiece 3.

The rail 561.1 has cut-outs or fillets 561.3 and 561.4. Likewise, the rail 561.2 has a cut-out or a fillet 561.5. The cut-outs 561.3, 561.4 and 561.5 form respective introduction ends for the rails 561.1 and 561.2.

On the first strip 511 and on the second strip 512, the plugged ends 511.6 and 512.6 are formed so as to engage by virtue of matched shapes respectively with the fillet 561.3 and 561.4. This engagement acts as a stop in order to prevent deformation as a result of the strips 511 and 512 being crushed against one another.

The user can thus clad the sidepiece 503.

According to other advantageous but optional features of the invention, considered in isolation or according to any technically possible combination:
- the connection means extend over the core in a discontinuous or intermittent manner;
- at least one holding member comprises an elastic snap-fitting member for fastening a strip onto connection means;
- the rails are in a single piece with or are an integral part of the core, instead of being affixed thereto;
- the longitudinal line along which the core extends is straight, or even broken;
- at least one holding member of the core is formed by a hole arranged so as to engage with a boss produced, i.e. arranged, on the first strip or on the second strip;
- at least one holding member of the core is formed by a blind opening, instead of a through opening, arranged so as to engage with a boss produced, i.e. arranged, on the first strip or on the second strip. The boss of the core thus remains hidden by the respective strip, which improves the esthetic quality of the sidepiece;
- at least one holding member of the first or second strip is formed by a blind opening, instead of a through opening, arranged so as to engage with a boss produced, i.e. arranged, on the core. The first or second strip can thus be relatively more compact as there is little modification to its structure;
- two rails and two slideways of the core are in the shape of similar helices, the common axis of which corresponds to the longitudinal axis of the core. The sidepiece with its strips thus has the appearance of a double-helix spiral staircase or a DNA molecule.

The invention claimed is:

1. A sidepiece for eyeglasses, comprising a core extending between a front end, intended to be articulated onto a frame, and a rear end facing away therefrom, the sidepiece being characterized in that it comprises at least:
    a first strip suitable to cover a first part of the core;
    a second strip suitable to cover a second part of the core;
    first connection means arranged on said first part of the core, the first connection means being designed to guide the first strip in translation and to hold the first strip on the core; and
    second connection means arranged on said second part of the core, the second connection means being designed to guide at least the second strip in translation and to hold the second strip on the core;
    wherein the first strip and the second strip are structured to be guided in translation and held separately and respectively by the first connection means and by the second connection means.

2. The sidepiece of claim 1, wherein the core has an upper edge and a lower edge, the first connection means being arranged on all or part of the upper edge, the second connection means being arranged on all or part of the lower edge.

3. The sidepiece according to claim 1, wherein the first connection means and/or the second connection means extend substantially as far as the front end so as to allow, respectively, the first strip or the second strip to be introduced via the front end.

4. The sidepiece according to claim 1, wherein the first connection means and/or the second connection means have, respectively, at least one male element projecting from an internal face of the core and/or from an external face of the core, the male element extending at least along a segment of the core, and wherein at least one of the first strip and the second strip has a groove having a shape complementary to the male element.

5. The sidepiece according to claim 1, wherein the first connection means has the same configuration as that of the second connection means.

6. The sidepiece according to claim 1, wherein at least one of the first strip and the second strip is at least partially formed from an elastically deformable material.

7. The sidepiece according to claim 1, wherein at least two of said strips are formed so as to fit together in order to hide the core either entirely or partially.

8. The sidepiece according to claim 1, wherein at least one of the first strip and the second strip has a plugged end arranged so as to cover the front end of the core.

9. The sidepiece according to claim 1, wherein the core comprises at least one holding member designed to immobilize the first strip or the second strip in translation with respect to the core.

10. Eyeglasses comprising a frame and wherein they further comprise at least one sidepiece according to claim 1.

11. A method for assembling a sidepiece according to claim 1 which is articulated onto a frame for eyeglasses according to claim 10, the method comprising the steps of:
    folding the sidepiece so as to place it close to the frame;
    engaging via the front end the first strip and/or the second strip, respectively, on the first connection means and on the second connection means;
    guiding in translation the first strip and the second strip respectively on the first connection means and on the second connection means such that the first strip and the second strip cover, respectively, the first part of the core and the second part of the core; and opening the sidepiece in order to place it in the position of use.

12. The sidepiece according to claim 1, wherein the second strip has a decorative external surface.

13. The sidepiece according to claim 1, wherein at least one of the first strip and the second strip is molded.

14. The sidepiece according to claim 9, wherein the at least one holding member is arranged to engage with a rear termination of the first strip or with a rear termination of the second strip.

15. The sidepiece according to claim 1, wherein the first strip has a decorative external surface.

\* \* \* \* \*